Aug. 24, 1954   R. H. McPHERSON   2,687,230
LINER FOR MIXERS
Filed Aug. 28, 1950
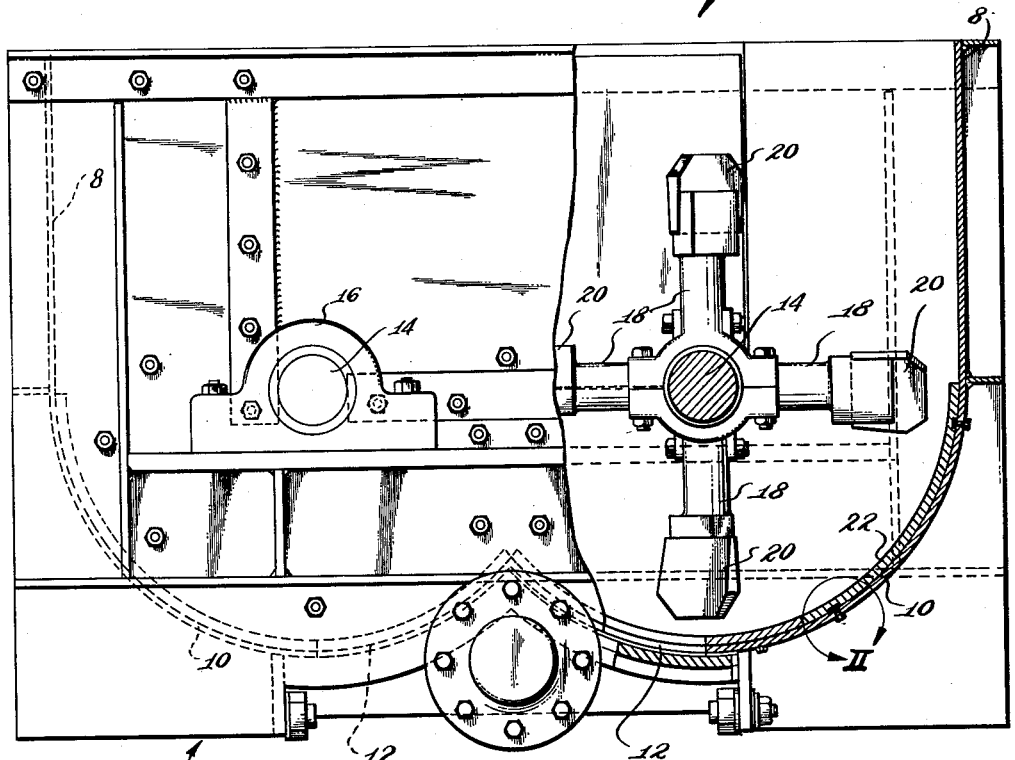
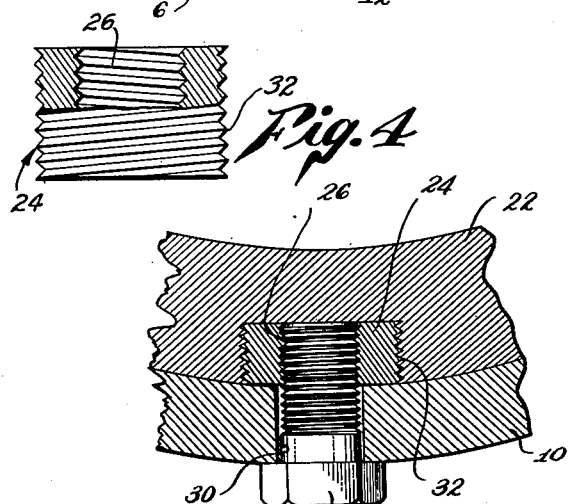
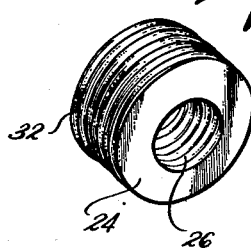
INVENTOR.
ROBERT H. McPHERSON
BY Wm. Edward Hann
Attorney

Patented Aug. 24, 1954

2,687,230

UNITED STATES PATENT OFFICE 2,687,230

LINER FOR MIXERS

Robert H. McPherson, Los Angeles, Calif., assignor to Standard Steel Corporation, Los Angeles, Calif., a corporation of California Application August 28, 1950, Serial No. 181,829

1 Claim. (Cl. 220—63)

This invention relates to a replaceable casing liner and is particularly adapted for use in mixers for abrasive materials, pug mills or the like.

It is a general object of the invention to provide a liner plate with means for firmly and conveniently anchoring the same in the mixer casing so that it can be readily removed or installed.

A more specific object is to provide a liner for mixer casings wherein the securing means does not extend through the inner surface of the liner, thereby presenting an unbroken wear surface in the mixer.

A further object is to provide bolt receiving and plate anchoring ferrules which are preformed and which are then cast into the liner plate when the latter is formed so that the ferrules will be securely held by the material of the liner plate.

Other objects and advantages will more fully appear from the following description made in connection with the accompanying drawing wherein:

Fig. 1 is a view partially in end elevation and partially in section of a mixer for paving materials showing the liner mounted therein.

Fig. 2 is an enlarged sectional detail taken approximately on the line II of Fig. 1.

Fig. 3 is an enlarged perspective view of one of the ferrules which serves as a liner anchor.

Figure 4 is an enlarged elevational view, partly in section, of one of the ferrules which illustrates the internal and external threads which are of the same hand.

In the drawing there is shown a mixer 6 which is particularly suitable for use in mixing aggregates with bitumens or cut-back asphalt such as is customarily used for road surfacing. The mixer includes side walls 8 whose upper portions are straight and whose lower portions 10 curve inwardly toward each other and meet at a line through the longitudinal center of the mixer. Each of the curved wall portions 10 is provided with a complementary opening 12 in the central portion of the mixer to discharge mixed materials therefrom.

Extending longitudinally through each half of the mixer casing is a shaft 14 supported by bearing blocks 16. Radiating from the shaft 14 is a plurality of mixer arms 18 having angularly disposed end portions 20. Ordinarily, in a mixer of this type, as is well known in the art, there will be a number of sets of mixer arms 18 disposed along each shaft 14 and each set of arms is offset about the shaft relative to its adjacent arms in staggered or spiral relationship. The particular disposition of the arms is not shown herein since it is not important to the present invention.

The curved casing portions 10 receive a considerable amount of abrasion from aggregates such as crushed rock. In order to prevent the casing from wearing, said curved portions 10 are provided with liner plates 22. These plates are preferably formed from abrasion resistant cast iron. It has been the universal custom in pug mill mixer construction methods to fasten the liner plates with bolts or studs which extend through to the wear surface approximately flush with that surface. Even though the end of the stud may be flush when the liners are installed, an objectionable and uneven amount of wear takes place at these points. The surface wears more rapidly around the end of the bolts or studs, creating seat-like depressions. This wear takes place rapidly and considerably shortens the life of the liners.

My invention is directed primarily to providing liner securing means which does not penetrate the wear surface, but which extends outwardly through the mixer wall.

Where a threaded ferrule is used as shown herein, it is impractical to place threaded bores directly in the cast iron since such material is brittle and the threads do not have the requisite strength. Therefore, as one means of securing the liners from the outside with no penetration through the wear surface, I provide ferrules 24 which are made preferably from mild steel and are internally threaded as at 26 to receive securing studs 28 which pass through suitable openings 30 in the casing portions 10 and fit the internally threaded ferrules.

Anchoring of the ferrules 24 in the cast iron liner plates 22 presented a problem. The liner plates are subjected to considerable amounts of force and the studs 28 sometimes need taking up in order to maintain the liner plates tight in the mixer casing. Conventional forms of anchoring a metal part in a casting are not satisfactory since the ferrules will loosen and cannot be securely tightened within the liner plates.

Ferrules constructed in accordance with the invention are provided with external threads 32 which are of the same hand as the internal threads 26. Consequently, when the studs 28 are tightened the ferrules 24 will simultaneously be tightened in the liner plate material. Thus every time the studs are turned to make the liner plate more secure relative to the mixer casing, the anchoring of the ferrules in the liner plate is restored to the desired snugness.

Not only do the ferrules tend to loosen through use of the machine but it is extremely difficult to snugly cast the mild steel ferrules in the cast iron plates because the two metals have different coefficients of expansion. If the ferrules are loose when the liner plates are originally cast they can be drawn tightly into the plates when the studs 28 are initially turned into the ferrules.

By casting the ferrules in the cast iron liner plates threads are formed in the material of the liner plates as the molten metal flows about the external threads 32 on the ferrules. The internally threaded portions 26 of the ferrules can be closed merely by placing a stud in the ferrule when the cast is made, or any suitable type of plug can be used.

Liner plates and anchoring means therefor, constructed in accordance with the invention, are relatively economical to manufacture and they can be readily inserted in mixer or pug mill casings or the like. Furthermore, as brought out above, the particular ferrule disclosed herein has the very decided advantage of being capable of tightening merely by turning the liner plate securing studs 28.

It should be understood that various changes in the form and details can be made without departing from the spirit of the invention.

I claim:

In a pug mill mixer for abrasive materials, a liner plate of uniform thickness and of a hard abrasive resistant material having an outer surface and an inner wear surface, said plate having threaded sockets therein open to the outer surface only, cylindrical ferrules having axial apertures therein and a substantial wall thickness about said apertures, the outer walls of said ferrules being provided with screw threads, the inner walls of said ferrules also being provided with screw threads separate and distinct from said screw threads on said outer walls, the threads on said outer walls screw threadedly engaging those of the sockets and the threads on the inner walls being of the same hand as the threads on the outer walls, and threaded securing bolts extending through the shell of the mixer and screwed into the ferrules, said securing bolts terminating in the ferrules outwardly from the inner wear surface of the liner plate.

References Cited in the file of this patent

UNITED STATES PATENTS

| Number | Name | Date |
|---|---|---|
| 33,993 | Hodge | Dec. 24, 1861 |
| 251,969 | Tayler | Jan. 3, 1882 |
| 294,639 | Larkin | Mar. 4, 1889 |
| 1,227,627 | Kennedy | May 29, 1917 |
| 1,327,917 | Kellar | Jan. 13, 1920 |
| 1,703,211 | Schmierer | Feb. 26, 1929 |
| 1,739,843 | Knight | Dec. 17, 1929 |
| 1,800,705 | Stine | Apr. 14, 1931 |
| 1,891,867 | Burdick et al. | Dec. 20, 1932 |
| 2,125,396 | Olshevsky | Aug. 2, 1938 |
| 2,222,768 | Gruender | Nov. 26, 1940 |
| 2,480,966 | Richardson et al. | Sept. 6, 1949 |